US008742369B2

(12) United States Patent
Rapoport et al.

(10) Patent No.: US 8,742,369 B2
(45) Date of Patent: Jun. 3, 2014

(54) VALUE DOCUMENTS AND OTHER ARTICLES HAVING TAGGANTS THAT EXHIBIT DELAYED MAXIMUM INTENSITY EMISSIONS, AND METHODS AND APPARATUS FOR THEIR AUTHENTICATION

(75) Inventors: William Ross Rapoport, Bridgewater, NJ (US); Carsten Lau, Garbsen (DE); James Kane, Lawrenceville, NJ (US)

(73) Assignee: Honeywell International Inc., Morristown, NJ (US)

( * ) Notice: Subject to any disclaimer, the term of this patent is extended or adjusted under 35 U.S.C. 154(b) by 265 days.

(21) Appl. No.: 13/276,209

(22) Filed: Oct. 18, 2011

(65) Prior Publication Data

US 2012/0104256 A1 May 3, 2012

Related U.S. Application Data

(60) Provisional application No. 61/408,817, filed on Nov. 1, 2010.

(51) Int. Cl.
*G01N 21/64* (2006.01)

(52) U.S. Cl.
USPC .......................................................... 250/458.1

(58) Field of Classification Search
USPC .......................................................... 250/458.1
See application file for complete search history.

(56) References Cited

U.S. PATENT DOCUMENTS 5,139,812 A 8/1992 Lebacq
6,155,605 A * 12/2000 Bratchley et al. ............... 283/72
8,121,386 B2 2/2012 Rancien
2002/0174794 A1* 11/2002 Lowden et al. ............... 102/517
2007/0145293 A1* 6/2007 Roth .......................... 250/458.1
2009/0218397 A1 9/2009 Wild et al.
2009/0308932 A1 12/2009 Wild et al.
2011/0087440 A1* 4/2011 Lau et al. ........................ 702/22
2011/0147450 A1* 6/2011 Rapoport et al. ............. 235/375
2011/0147614 A1* 6/2011 Kane et al. ................. 250/459.1
2012/0153184 A1* 6/2012 Kane .......................... 250/458.1

(Continued)

FOREIGN PATENT DOCUMENTS

EP 919961 B1 6/2003
EP 1520190 B1 1/2007

(Continued)

OTHER PUBLICATIONS

Sardar, et al. "Absorption Intensities and Emission Cross Section of Principal Intermanifold and Inter-Stark Transitions of Er3+(4f11) Polycrystalline Ceramic Garnet Y3AI5O12," Journal of Applied Physics, 97, 123501, Jun. 2005.

(Continued)

*Primary Examiner* — Casey Bryant
(74) *Attorney, Agent, or Firm* — Ingrassia Fisher & Lorenz, PC

(57) ABSTRACT

Value documents or other articles having authentication features, authentication apparatuses, and methods of authentication are provided that relate to the use of taggants that absorb radiation from an illumination source and emit radiation in a manner that has a maximum intensity occurring a duration of time after the illumination source has been switched off. The taggants include a crystalline composition comprising a host crystal lattice doped with a first rare earth active ion, and in some examples a second rare earth active ion.

20 Claims, 5 Drawing Sheets

(56) References Cited

U.S. PATENT DOCUMENTS

| | | | | |
|---|---|---|---|---|
| 2013/0015369 | A1* | 1/2013 | Rapoport et al. | 250/459.1 |
| 2013/0015651 | A1* | 1/2013 | Lau et al. | 283/74 |
| 2013/0048874 | A1* | 2/2013 | Rapoport et al. | 250/459.1 |
| 2013/0119274 | A1* | 5/2013 | Kane et al. | 250/459.1 |
| 2013/0122266 | A1* | 5/2013 | Kane et al. | 428/195.1 |
| 2013/0181144 | A1* | 7/2013 | Rapoport et al. | 250/459.1 |

FOREIGN PATENT DOCUMENTS

| | | | | | |
|---|---|---|---|---|---|
| GB | 2258659 | A | * | 2/1993 | C09K 11/84 |
| JP | 2004185126 | A | * | 7/2004 | G07D 7/00 |
| JP | 2009507690 | A | | 2/2009 | |
| WO | 9602901 | A1 | | 2/1996 | |
| WO | 2006056810 | A2 | | 6/2006 | |
| WO | 2006077445 | A2 | | 7/2006 | |

OTHER PUBLICATIONS

Zhang, et al., "Size manipulated photoluminescence and phosphorescence in CaTiO 3:Pr3+ nanoparticles," Journal of Physical Chemistry C, vol. 111, No. 49, Dec. 13, 2007, p. 18044-18048.

* cited by examiner

VALUE DOCUMENTS AND OTHER ARTICLES HAVING TAGGANTS THAT EXHIBIT DELAYED MAXIMUM INTENSITY EMISSIONS, AND METHODS AND APPARATUS FOR THEIR AUTHENTICATION

RELATED APPLICATION

This application claims priority to U.S. Provisional Application Ser. No. 61/408,817, filed on Nov. 1, 2010.

FIELD OF THE INVENTION

The technical field relates generally to a method and validation apparatus for authenticating a stationary value document using emitted infrared emission characteristics from one or more covert compositions incorporated on or within a value document when excited by an incident light pulse.

BACKGROUND

There are many ways to validate or authenticate a value document, from simple to complex. Some methods involve visible, also referred to as overt, features on or incorporated into a document, such as a hologram on a credit card, an embossed image or watermark on a bank note, a security foil, a security ribbon, colored threads or colored fibers within a bank note, or a floating and/or sinking image on a passport. While these features are easy to detect with the human eye and generally do not require equipment for authentication, these overt features are easily identified by a would-be forger and/or counterfeiter. As such, hidden, also referred to as covert, features may be incorporated in value documents, either in lieu of or in addition to overt features. Covert features can include invisible fluorescent fibers, chemically sensitive stains, fluorescent pigments or dyes that are incorporated into the substrate of the value document. Covert features can also be included in the ink that is printed onto the substrate of the value document or within the resin used to make films that are used in laminated value documents. Since covert features are not detectable by the human eye, detectors configured to detect these covert features are needed to authenticate the value document.

Some covert features incorporate taggants that absorb radiation from a light source and emit detectable radiation having properties, such as wavelength and decay time, which can be used to determine whether the value document incorporating the feature is authentic. For example, some covert taggants use rare earth active ions that have been incorporated into oxide crystal lattices. Most oxide crystal lattices are essentially closed packed structures of oxygen ions where metallic ions may be connected to oxygen atoms of the crystal lattice resulting in symmetries of the crystal fields. Oxide crystals typically result in rapid decay of absorbed radiation to a storage energy level followed by decay to lower energy levels. When such covert taggants are illuminated by a light source, they tend to have a peak in their intensity of emitted radiation that corresponds to the point in time when the light source is shut off and thereafter, the emitted radiation exhibits rapid emission decay.

FIG. 1 is a graph 100 illustrating intensities (in arbitrary units, AU) of an excitation signal 102 and an emission signal 104 with respect to time for one example of a prior art system in which a value document including a covert taggant is illuminated by an LED light source for 10 milliseconds. As illustrated, the intensity of the radiation emitted from the taggant builds during the time that the light source is on, and then decays rapidly once the light source is shut off, decreasing exponentially, as expected, for many existing luminescent covert taggants. The exponential decay constant is a function of the specific taggant used, the host lattice material, and the doping amounts of substitute ions, and is defined as the time required for the emission intensity to decay to the 1/e value. This "1/e value" is referred to as the lifetime "Tau" ($\tau$).

SUMMARY

The present technology relates to the use of covert taggants in or on a value document or other article, and particularly to the use of taggants that absorb radiation from an illumination source during an illumination period, and emit radiation in a manner that exhibits a peak intensity at a point in time after the end of an illumination duration, when the illumination source is switched off.

In one aspect, a method of authenticating a value document or other article using an authentication apparatus is provided that includes providing a value document or other article to the authentication apparatus, the value document or other article comprising at least one taggant having a crystal lattice doped with a first rare earth active ion. The method also includes applying radiation having a first wavelength from an illumination source of the authentication apparatus to the value document or other article for an illumination duration. The taggant absorbs radiation from the illumination source and emits infrared radiation having a second wavelength that is greater than the first wavelength of the radiation, the infrared radiation emitted from the taggant having a maximum intensity that occurs at a delay period measured from the end of the illumination duration, the delay period being greater than about 0.1 milliseconds. The method further includes detecting intensity of the emitted infrared radiation over time with a sensor of the authentication apparatus to produce emission data, then processing the emission data with a processor of the authentication apparatus to determine whether the value document or other article is authentic, wherein the processing includes identifying the maximum intensity of the emitted infrared radiation that occurs after the illumination source is switched off and comparing the measure maximum intensity with predetermined authentic data.

In another aspect, a value document or other article is provided that includes a covert feature. The value document or other article comprises at least one taggant having a crystal lattice doped with a first rare earth active ion, the taggant being configured to absorb radiation having a first wavelength from an illumination source during an illumination duration having an end, and to emit infrared radiation having a second wavelength that is greater than the first wavelength of the radiation from the illumination source. The infrared radiation emitted from the taggant has a maximum intensity that occurs at a delay period measured from the end of the illumination duration, the delay period being greater than about 0.1 milliseconds.

In a third aspect, an authentication apparatus is provided that includes an illumination source, a sensor, and a processor. The illumination source applies radiation having a first wavelength to a value document or other article for an illumination duration having an end. The sensor detects intensity of infrared radiation emitted from the value document or other article over time to produce emission data, the infrared radiation emitted from the value document or other article having a second wavelength greater than the first wavelength and having a maximum intensity that occurs at a delay period measured from the end of the illumination duration, the delay period being greater than about 0.1 milliseconds. The processor processes the emission data and identifies the maximum intensity of the emitted infrared radiation that occurs after the delay period in order to compare the emission data to predetermined authentic data to further determine whether the value document or other article is authentic.

BRIEF DESCRIPTION OF THE DRAWINGS

Specific examples have been chosen for purposes of illustration and description, and are shown in the accompanying drawings, forming a part of the specification.

DETAILED DESCRIPTION

The present technology relates to authentication features that can be incorporated into or onto value documents or other articles, and can be detected using authentication apparatuses as described herein. The authentication features use one or more taggants that absorb radiation from an illumination source that is switched on during an illumination duration and is switched off at the end of the illumination duration. The illumination source is then kept off during an off duration. Once radiation is absorbed, the taggants emit infrared radiation in a manner having a maximum intensity that occurs after the end of the illumination duration (i.e., when the illumination source is switched off). The illumination source can function in a periodic pulsed manner, providing a plurality of illumination durations, where each illumination duration is separated by an off duration, during which the illumination source is switched off. The length of time of each illumination duration is preferably identical, and the length of time of each off duration is also preferably identical. The length of time of each illumination duration may be selected based upon the properties of the authentic taggant, and is preferably sufficiently short to facilitate the occurrence of the maximum emission intensity at a detectable delay period after the end of the illumination period. The length of time of each off duration may also be selected based upon the properties of the authentic taggant, and is preferably sufficiently long to allow for the taggant emission to decay to zero before repeating the illumination duration. The use of periodic pulsed illumination allows for numerous data sets to be measured and recorded in the emission data that is collected by the authentication apparatus. The emission data having a number of data sets can then be statistically analyzed to achieve a higher degree of temporal accuracy.

Figure 2:
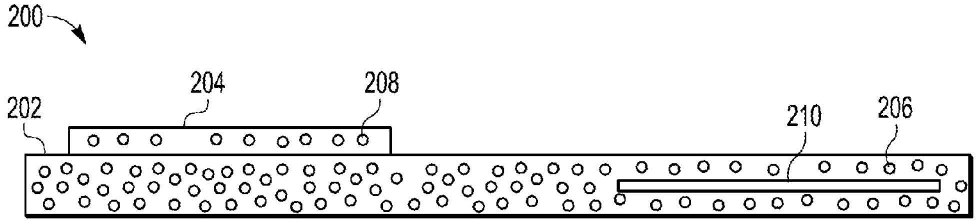
FIG. 2 illustrates a value document or other article, in accordance with various embodiments.

Taggants of the present technology are incorporated into or onto an article, such as a value document (e.g., a banknote, a check, a stock certificate) or other article (e.g., an identification card, a driver's license, a passport, identity papers, a document, a paper, a packaging component, a credit card, a bank card, a label, a seal, a postage stamp, a token, a liquid, a human, an animal, and a biological sample), in various embodiments. The taggants may be in the form of particles, for example, which may be mixed with substrate material, ink (e.g., a clear or colored ink) or other printed feature material (e.g., a pigment or paint), a coating, or other components of the value document or article. The value documents or other articles can include a substrate, a carrier, an embedded feature, a surface-applied feature, and/or a printed material. For example, but not by way of limitation, FIG. 2 illustrates a value document or article 200, which includes a substrate 202 and printed material 204. The substrate 202 can be any suitable substrate, including for example, paper, cardstock, vellum, woven or non-woven fabric, and films such as extruded films or laminated films. Likewise the printed material 204 can include any suitable material, and substrates can include more than one type of printed material. In some examples, the printed material 204 is an ink. The substrate of the value document or other article, printed material of the value document or other article, or both, can include at least one taggant of the present technology (e.g., taggant 206 in the substrate 202 and taggant 208 in the printed material 204). In examples where the substrate 202 of the value document or other article 200 includes a taggant 206, the taggant 206 can be present in an amount from about 0.1% by weight of the substrate to about 30% by weight of the substrate 202, or a preferred range from about 0.1% by weight of the substrate to about 1% by weight of the substrate 202. In examples where printed material 204 of the value document or other article 200 includes a taggant 208, the taggant 208 can be present in an amount from about 0.1% by weight of the printed material to about 30% by weight of the printed material 204, or a preferred range about 0.5% by weight of the printed material 204 to about 15% by weight of the printed material 204. In alternate embodiments, the taggant may be present in an embedded feature 210 (e.g., a security thread) or in another feature that is integrated with the substrate material or applied to a surface of the substrate 202. In at least some applications, it is desirable to include sufficient taggant in printed matter on the value document or other article so that the value document or other article can be authenticated even when it is worn or aged, such as for example when the value document is a bank note that is in circulation.

Taggants of the present technology comprise a crystalline composition that includes a host crystal lattice doped with at least a first rare earth active ion. In some examples, the crystal lattice is doped with a second rare earth active ion. The host crystal lattice material, first rare earth active ion, and any second rare earth active ion can be selected and incorporated as the taggant in order to provide the desired properties of the taggant. For example, the taggant may be selected to exhibit a relatively rapid absorption of the radiation from the illumination source during the illumination duration, and may initially store the absorbed radiation in a first storage energy level, which may be a transient storage energy level. The taggant may then transfer absorbed energy from the first storage energy level to a second storage energy level, which may be an emitting storage energy level, and may then emit infrared radiation from that second storage energy level. Since there can be a difference in the decay values of Tau between the two energy levels, it is possible to see the population of the second storage energy level increase after the illumination has been turned off. This can occur when the decay constant of the second level is less than the decay rate of the level supplying it. In at least one such example, the intensity of the emitted radiation continues to build after the end illumination duration, during the off duration when the illumination source is switched off, building to a maximum, or peak, intensity over a delay period, and then decaying. The delay period is measured from the end of the illumination duration, and is the amount of time that it takes for the intensity of the emitted radiation to reach its maximum. The decay of the intensity of the emitted radiation after the delay period can be an exponential decay combined with any residual energy flow continuing into the second storage level.

When the maximum, or peak, intensity of the infrared radiation emitted from the taggant occurs at a sufficient delay period, the maximum intensity can be detected by conventional infrared detectors and is processed by conventional electronics. The delay period is preferably greater than about 0.1 milliseconds, greater than about 0.2 milliseconds, or greater than about 0.5 milliseconds. For example, the delay period can be from about 0.1 milliseconds to about 5 milliseconds.

Suitable crystalline lattices that can be used as host materials include inorganic crystalline lattices selected from oxyfluorides, fluorides, and oxysulfides, while other crystalline lattices may be used in some examples. Without being bound by any particular theory, it is believed that at least some of the temporal behavior of the taggants is a result of using crystal lattices in which other atoms such as sulfur or fluorine replace oxygen ions thereby resulting in a corresponding lattice distortion. In some examples, the crystalline lattice can be yttrium oxysulfide, sodium ytterbium fluoride, or sodium yttrium fluoride.

The first rare earth active ion can be selected such that it absorbs radiation having a first wavelength from the illumination source into a first storage energy level and transfers non-radiatively the absorbed radiation to a second storage energy level, which can be a storage energy level of the first or second rare earth ion. The second storage energy level can decay radiatively to a lower energy level by emitting infrared radiation having a second wavelength as a down converter. The second wavelength is greater than the first wavelength of the radiation from the illumination source that is absorbed by the first rare earth active ion.

The first rare earth active ion preferably absorbs radiation from the illumination source by narrow or broad band absorption. The absorption by the first rare earth active ion is preferably very rapid, such as being below about 0.01 milliseconds. The first rare earth active ion can transfer the absorbed radiation to the second storage energy level at a lifetime $\tau 1$, and the second storage energy level can have a lifetime $\tau 2$. The lifetime $\tau 1$ is preferably from about 50% of $\tau 2$ to about 95% of $\tau 2$. In at least one example, $\tau 2$ can be from about 1.5 milliseconds to about 10 milliseconds, and $\tau 1$ can be from about 1 millisecond to about 9 milliseconds. Given the rapid absorption of the radiation from the illumination source, illumination duration is preferably for an amount of time $\tau 3$, which can be from about 0.1 milliseconds to about 1 millisecond, or that is from about 4% of $\tau 2$ to about 10% of $\tau 2$.

Periodic pulsed illumination is preferably used, wherein the illumination source is turned on and off in a repetitive, periodic pulsed manner to provide a plurality of illumination durations separated by a plurality of off durations, and data is gathered during each repetition. Repetitive periodic pulsed illumination allows for a plurality of data sets to be measured and recorded in the emission data, which can then be analyzed, and can allow the use of statistics in the computation section of the authentication apparatus through signal averaging techniques. The off duration, which is the amount of time that the illumination source is turned off between illumination durations, should be greater than the delay period, and should be greater than the delay period and the decay period combined, and is preferably greater than the time during which the intensity of the radiation emitted from the taggant falls to zero.

Erbium (Er) is one example of a preferred first rare earth active ion for use in the taggants of the present technology. The use of erbium allows taggants to absorb visible or infrared radiation from the illumination source as a narrow or a band absorber. A band or line absorber absorbs incident infrared radiation over a wide or narrow spectral range depending on the absorption characteristics of the ions, and therefore can be sufficiently excited by infrared illumination sources such as, for example, a 660 nanometer (nm) red LED light source, which targets one the 4F9/2 strong absorption bands of erbium. The emission from the first storage energy level of the erbium rare earth active ion can be at about 980 nm using the 4I11/2 to 4I15/2 transition, which is in the infrared wavelength range whose energy storage arises from the non-radiative decay of the 4F9/2 absorption band to the 4I11/2 storage level.

Ytterbium (Yb) is one example of a preferred second rare earth active ion for use in the taggants of the present technology. Ytterbium acts well as an acceptor ion for energy transfer from other rare earth or transition metal ions (e.g., erbium).

Both erbium and ytterbium exhibit a long lifetime storage energy level that is charged at slow enough rates so that the decay constant of the second level is less than the decay rate of the level supplying it. Thus, the second storage level continues to charge after the illumination duration, when the illumination source is switched off, producing a maximum in the emitted intensity after a delay period measured from the end of the illumination duration. In examples where erbium and ytterbium are incorporated in yttrium oxysulfide, sodium yttrium fluoride or sodium ytterbium fluoride crystal lattices, erbium tends to emit at about 980 nm characteristic wavelength, while ytterbium tends to emit emits at about 1030 nm characteristic wavelength. In this case, the absorption can take place in the 4F9/2 level typically using a 660 nm LED as the illumination source. The energy from the 4F9/2 level non-radiatively decays the 4I11/2 erbium level. The energy from that erbium level can then non-radiatively transfer to the 2F5/2 level of ytterbium. Emission at about 1030 nm then takes place on the radiative 2F5/2 to the 2F7/2 ytterbium transition. The amount of emission on the various transitions depends upon the dopant levels of the substitute ions.

Figure 1:
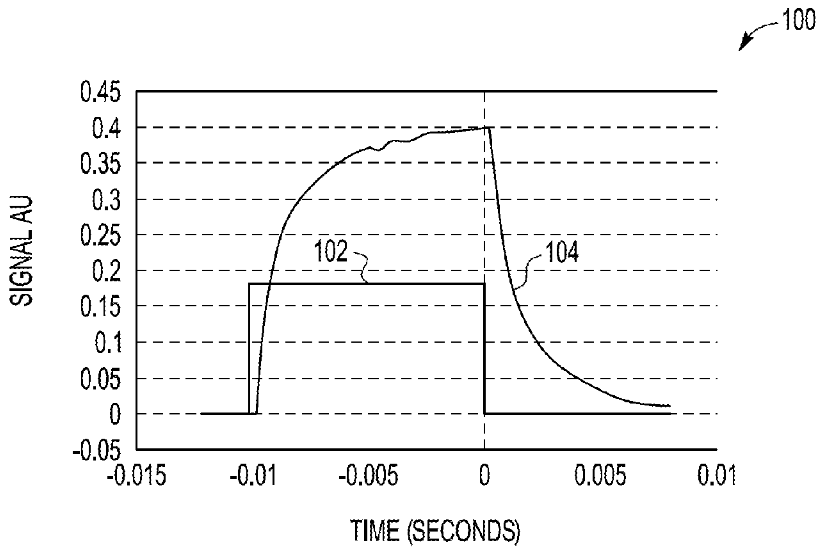
FIG. 1 illustrates an intensity versus time graph of a prior art system, wherein the emitted intensity declines with no maximum occurring after the illumination is switched off.
Figure 3:
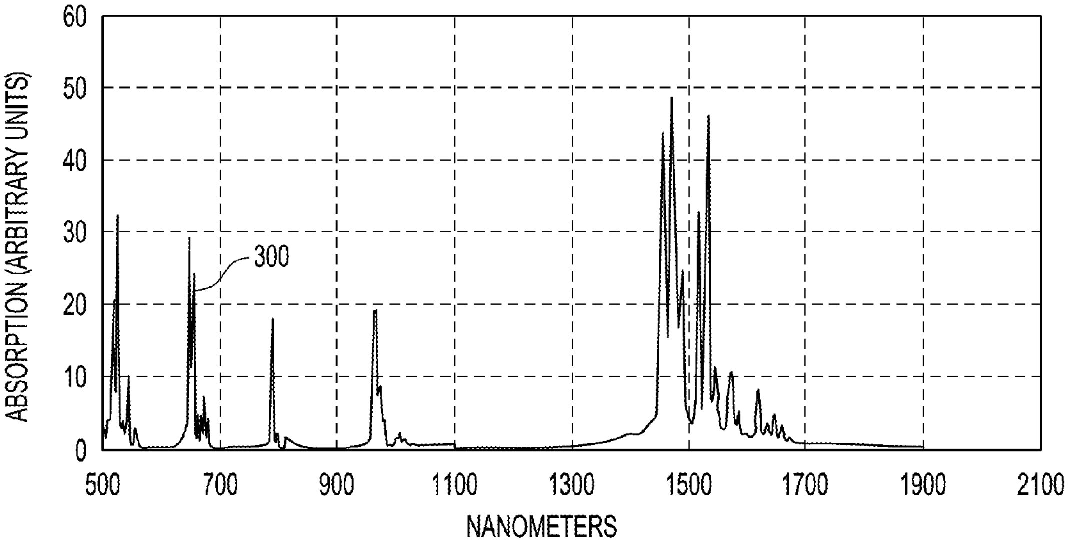
FIG. 3 illustrates an absorption versus wavelength graph of the measured absorption behavior of an inorganic yttrium aluminum garnet host lattice with rare earth ions of erbium showing narrow line absorption behavior near 660 nm, in accordance with an embodiment.
Figure 4:
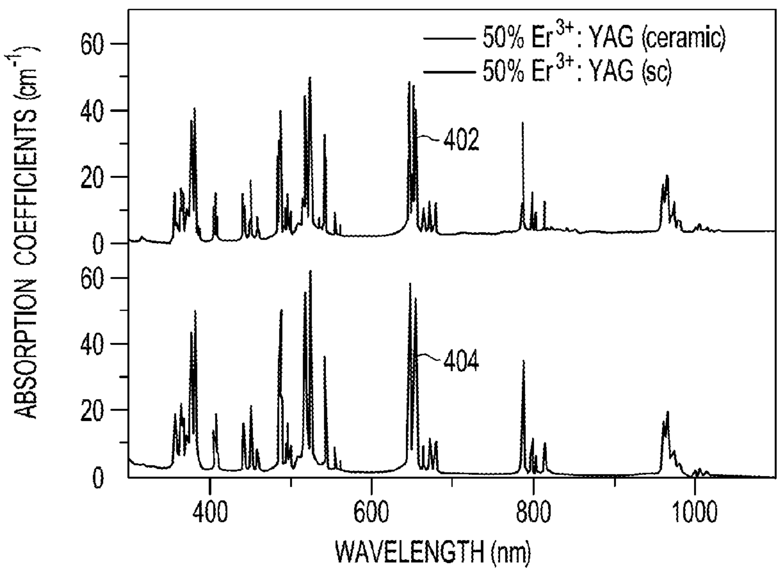
FIG. 4 illustrates an absorption versus wavelength graph of the measured absorption behavior of a single crystalline yttrium aluminum garnet and a poly-crystalline ceramic host each doped with 50% erbium showing multiple narrow line absorption features near 660 nm, in accordance with an embodiment.
Figure 5:
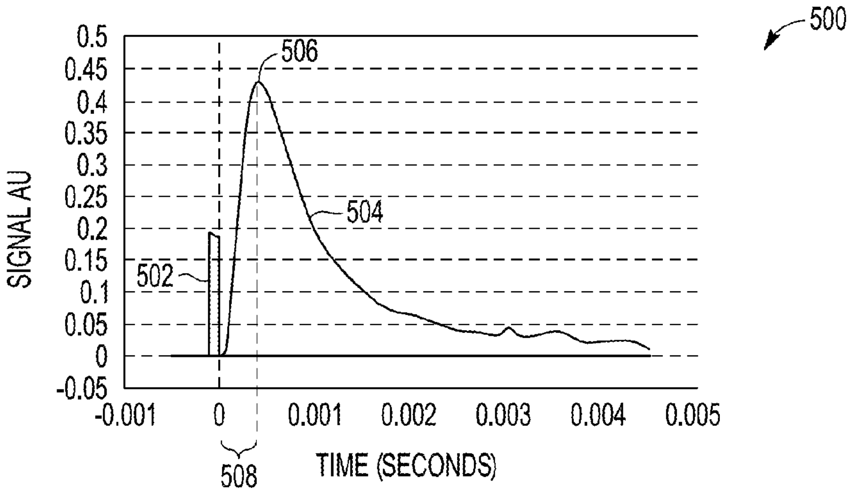
FIG. 5 illustrates an intensity versus time graph of the emission behavior of an inorganic phosphor of yttrium oxysulfide doped with rare earth ions of erbium and ytterbium as used with the present technology, showing a pulsed illumination duration of 0.1 milliseconds and an emission that has a maximum intensity occurring after the illumination duration, in accordance with an embodiment.

FIG. 3 is a graph illustrating the measured absorption curve 200 (in arbitrary units, AU) of a known inorganic yttrium aluminum garnet with rare earth ions of erbium, with respect to excitation signal wavelength (in nm). Graph 300 shows multiple narrow line absorption behavior near 660 nm. FIG. 4 illustrates similar absorption curves 402, 404 as shown in the publication by Sardar et al. "Absorption Intensities and Emission Cross Section of Principal Intermanifold and Inter-Stark Transitions of Er3+(4f11) Polycrystalline Ceramic Garnet $Y_3Al_5O_{12}$," Journal of Applied Physics, 97, 123501 (2005), which shows absorption behavior up to 1100 nm. The wavelength of the 660 nm absorption corresponds with the first figure as shown in FIG. 1, and therefore, the taggant embedded in the print ink may be easily excited by an LED emitting pulses of 660 nm wavelength radiation.

FIG. 4 illustrates an intensity versus time graph 500 of the emission behavior of an inorganic phosphor of yttrium oxysulfide doped with rare earth ions of erbium and ytterbium as used with the present technology, showing a pulsed illumination signal 502 having a duration of 0.1 milliseconds, and an emission intensity signal 504 (indicating emissions from the erbium ions) that has a maximum intensity 506 occurring after the illumination duration. The phosphor composition is a crystalline lattice of yttrium oxysulfide doped with rare earth ions of erbium and ytterbium, where the erbium is substituted for rare earth ions of the host lattice at a substitution percentage in a range from about 6 to about 20 percent, and the ytterbium is substituted for rare earth ions of the host lattice at a substitution percentage in a range from about 6 to about 20 percent. The phosphor has a high absorption coefficient for the LED light, and the energy absorbed at high energy levels decays to the first, transient, storage energy level fast enough with subsequent emission while decaying to the second storage level. The LED illumination duration was set at 0.1 milliseconds. The second energy level continued to receive energy from the first energy level after the end of the illumination duration (at time=0 seconds), when the light source was switched off, and this effect was shown by the detected maximum emission intensity 506. The emission at about 980 nm was the transition from Er 4I11/2 to the 4I15/2 energy state. The maximum intensity was detected at a delay period 508 of approximately 0.6 milliseconds.

Figure 6:
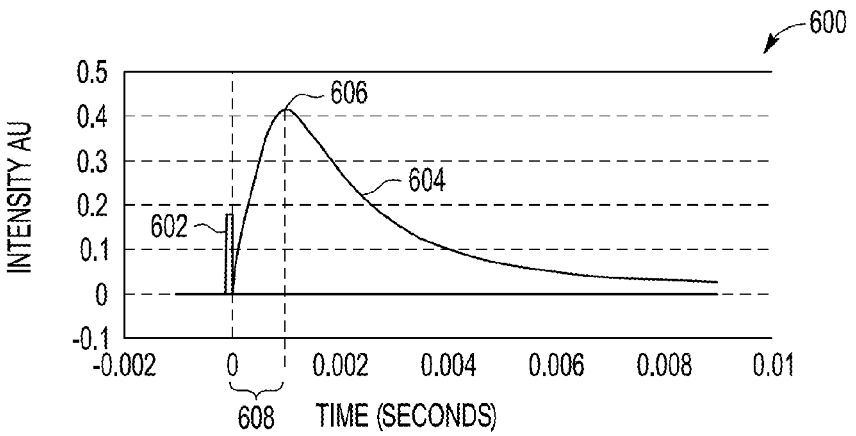
FIG. 6 illustrates an intensity versus time graph of the emission behavior an inorganic phosphor of sodium yttrium fluoride doped with rare earth ions of erbium and ytterbium as used with the present technology, showing a pulsed illumination of 0.1 milliseconds resulting in an emission that has a maximum intensity occurring after the illumination duration, in accordance with an embodiment.

FIG. 6 illustrates an intensity versus time graph 600 of the emission behavior an inorganic phosphor of sodium yttrium fluoride doped with rare earth ions of erbium and ytterbium as used with the present technology, showing a pulsed illumination signal 602 of 0.1 milliseconds resulting in an emission intensity signal 504 (indicating emissions from the erbium ions) that has a maximum intensity 606 occurring after the illumination duration. The phosphor composition is a crystalline lattice of sodium yttrium fluoride doped with rare earth ions of erbium and ytterbium, where the erbium is substituted for rare earth ions of the host lattice at a substitution percentage in a range from about 6 to about 20 percent, and the ytterbium is substituted for rare earth ions of the host lattice at a substitution percentage in a range from about 6 to about 20 percent. The phosphor has high absorption coefficient for the LED light and the energy absorbed at high energy levels decays to the first, transient storage energy level fast enough with subsequent emission while decaying to the second, emitting storage level. The LED illumination duration was set at 0.1 milliseconds. The second storage level continued to receive energy from the first energy level after the end of the illumination duration, when the illumination source was switched off, and this effect was shown by the detected maximum emission intensity 606. The emission at about 980 nm was the transition from Er 4I11/2 to the 4I15/2 energy state. The maximum intensity 606 was detected at a delay period 608 of approximately 1.1 milliseconds. The phosphor also exhibited emission from the ytterbium rare earth ion at about 1030 nm as a result of the transition from 2F5/2 to the 2F7/2 energy state that also exhibits a similar maximum peak in the intensity of emitted radiation.

Figure 7:
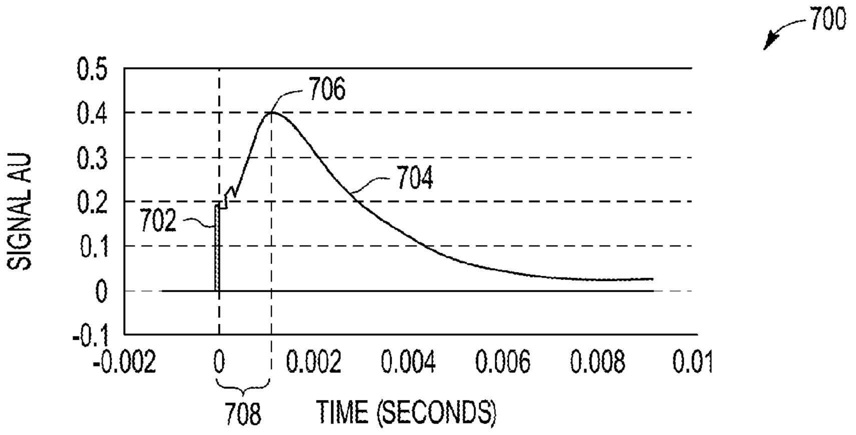
FIG. 7 illustrates the emission behavior of an inorganic phosphor of sodium ytterbium fluoride doped with rare earth ions of erbium and ytterbium showing a pulsed illumination duration of 0.1 milliseconds and an emission that has a maximum intensity occurring after the illumination duration, in accordance with an embodiment.
Figure 8:
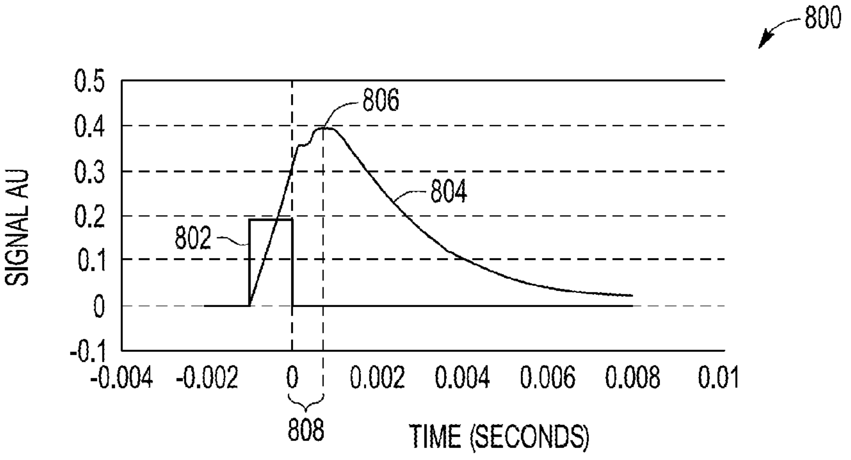
FIG. 8 illustrates the emission behavior of an inorganic phosphor of sodium ytterbium fluoride doped with rare earth ions of erbium and ytterbium showing a pulsed illumination duration of 1.0 milliseconds and an emission that has a less sharp maximum intensity compared to FIG. 6 occurring after the illumination duration, in accordance with an embodiment.
Figure 9:
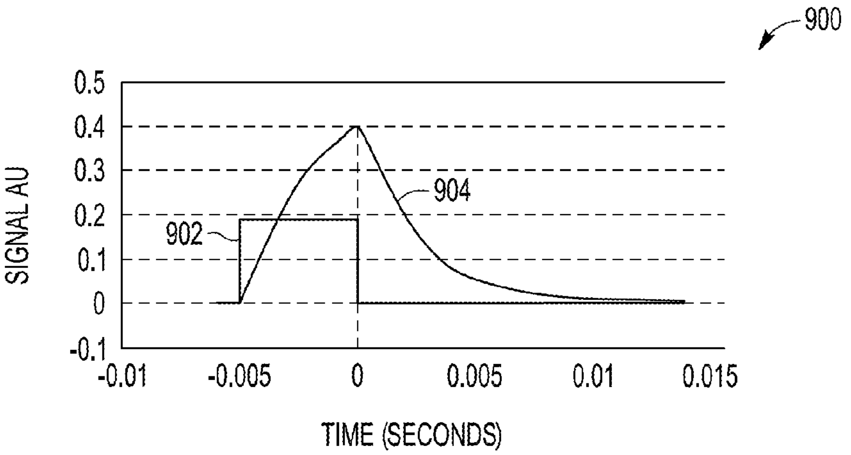
FIG. 9 illustrates the emission behavior of an inorganic phosphor of sodium ytterbium fluoride doped with rare earth ions of erbium and ytterbium showing a pulsed illumination duration of 5.0 milliseconds and an emission that has no maximum intensity occurring after the illumination duration, in accordance with an embodiment.

FIGS. 7-9 illustrate the emission behavior of an inorganic phosphor of sodium ytterbium fluoride doped with rare earth ions of erbium and ytterbium as it relates to different illumination durations. More particularly, FIG. 7 illustrates an intensity versus time graph 700 of the emission behavior of an inorganic phosphor of sodium ytterbium fluoride doped with rare earth ions of erbium and ytterbium showing a pulsed illumination signal 702 having a duration of 0.1 milliseconds and an emission intensity signal 704 that has a maximum intensity 706 occurring a delay period 708 after the illumination duration. FIG. 8 illustrates an intensity versus time graph 800 of the emission behavior of an inorganic phosphor of sodium ytterbium fluoride doped with rare earth ions of erbium and ytterbium showing a pulsed illumination signal 802 having a duration of 1.0 milliseconds and an emission intensity signal 804 that has a less sharp maximum intensity 806 compared to FIG. 7 occurring a delay period 808 after the illumination duration. Finally, FIG. 9 illustrates an intensity versus time graph 900 of the emission behavior of an inorganic phosphor of sodium ytterbium fluoride doped with rare earth ions of erbium and ytterbium showing a pulsed illumination signal 902 having a duration of 5.0 milliseconds and an emission intensity signal 904 that has no maximum intensity occurring after the illumination duration. These figures show that, as the illumination duration of the exciting radiation of between 0.1 and 1 milliseconds provides a maximum in the infrared emission intensity that occurs at a delay period after the end of the illumination duration, such a delayed maximum peak is absent when the illumination duration is 5 milliseconds. It is thus preferred that the illumination duration be from about 4% to about 10% of the lifetime of the second storage energy level $\tau 2$.

Figure 10:
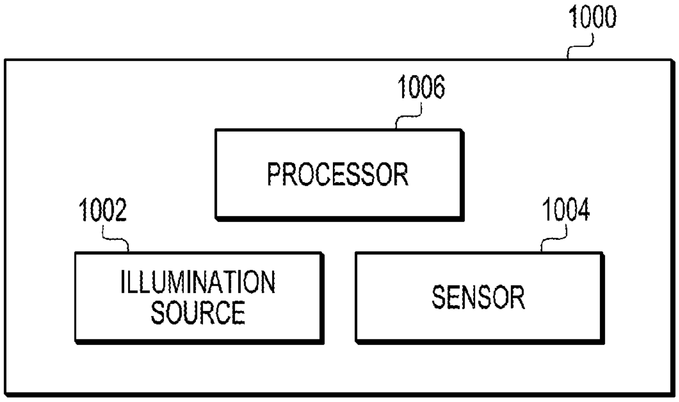
FIG. 10 illustrates an authentication apparatus, in accordance with an embodiment.

In view of the properties designed into the taggants of the present technology, authentication apparatuses 1000 of the present technology can include an illumination source 1002, a sensor 1004, and a processor 1006, as shown in FIG. 10. The illumination source 1002 that provides radiation having a first wavelength can illuminate a value document or other article for an illumination duration. The illumination source 1002 can be any suitable source, including for example, an LED that emits radiation at an absorbing wavelength of the first active ion, or other light sources such as laser diodes that can have sufficiently short illumination durations, such as less than about 1 millisecond, including for example about 0.1 milliseconds. The illumination source 1002 can also preferably apply periodic pulsed illumination, which provides a plurality of illumination durations, with each illumination duration being separated by an off duration. The sensor 1004 can detect intensity of infrared radiation emitted from the taggant of the value document or other article over time, including from the start of each illumination duration, during each illumination duration, continuing after each illumination duration, and to the final decay of each taggant response, in order to produce sets of emission data. For each illumination duration, the infrared radiation emitted from the taggant of the value document or other article, which is detected by the sensor 1004, has a second wavelength that is greater than the first wavelength, and has a maximum intensity that occurs after the illumination duration. The sensor 1004 can receive the emitted infrared radiation from the first or second rare earth active ion, measure the intensity thereof, and can record the temporal characteristics of the emitted infrared radiation to produce emission data. The processor 1006, which can be a software program embedded in the EPROM of a computing unit, processes the emission data in order to determine whether the value document is authentic based on predetermined authentic parameters. The predetermined authentic parameters are parameters based upon the material properties of the authentic taggant, and can include a pre-defined maximum intensity value, and/or a pre-defined delay period (e.g., a delay period in a range of about 0.0005 to about 0.002 seconds) at which a maximum intensity is reached. Accordingly, the processing step may include identifying the maximum intensity of the emitted infrared radiation that occurs after the illumination duration, and identifying the delay period after which the maximum intensity occurs. When periodic pulsed illumination is applied, the processing step may include identifying the maximum intensity and the delay period of the emitted infrared radiation that occurs after each illumination duration.

Figure 11:
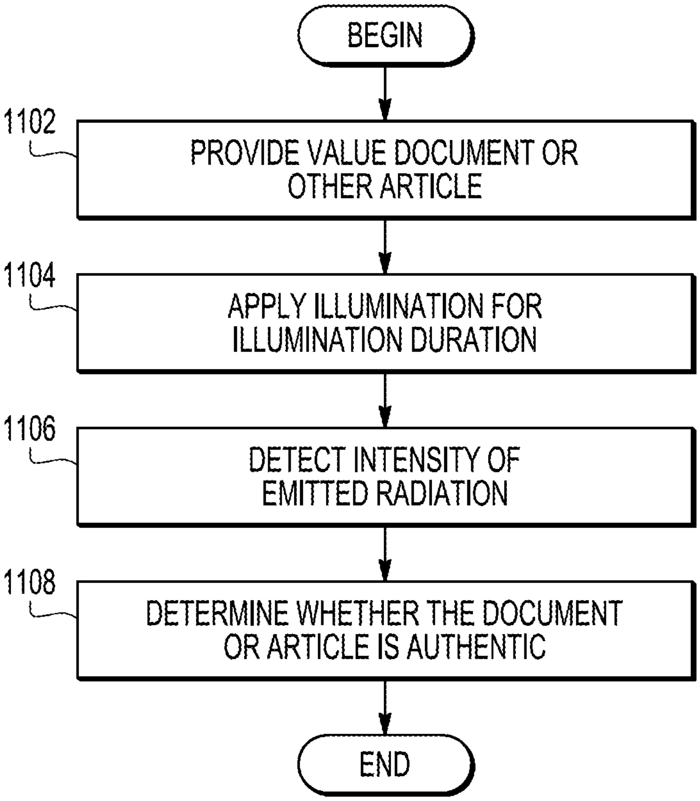
FIG. 11 illustrates a method of authenticating a value document or other article, in accordance with an embodiment.

FIG. 11 illustrates a method of authenticating a value document or other article, in accordance with various embodiments. In accordance with the above discussion, value documents or other articles of the present technology can be authenticated using an authentication apparatus (e.g., authentication apparatus 1000, FIG. 10) by providing a value document or other article to the authentication apparatus, in block 1102, and using the authentication apparatus to authenticate the value document or other article based on predetermined authentic parameters. The authentication method can include applying illumination to the value document from an illumination source of the authentication apparatus for an illumination duration, in block 1104. The illumination comprises radiation having a first wavelength. The step of applying illumination may include applying pulsed illumination having a plurality of illumination durations, with each illumination duration being separated by an off duration, during which the illumination source is switched off. The taggant absorbs radiation from the illumination during the illumination duration, and emits infrared radiation having a second wavelength that is greater than the first wavelength of the radiation of the illumination. Additionally, the infrared radiation emitted from the taggant has a maximum intensity that occurs at a delay period, which is measured from the end of each illumination duration. The authentication method can also include detecting intensity of the emitted infrared radiation over time with a sensor of the authentication apparatus to produce emission data, in block 1106. The value document or other article is stationary during the steps of applying the illumination and detecting intensity of the emitted infrared radiation. The authentication method can further include processing the emission data with a processor of the authentication apparatus to determine whether the value document is authentic, in block 1108. The processing can include identifying the maximum intensity of the emitted infrared radiation that occurs after the illumination duration, and determining the delay period when the maximum intensity occurred. When pulsed illumination is applied, the processing can include identifying the maximum intensity and the delay period of the emitted infrared radiation that occurs after each illumination duration. When the maximum intensity and/or the delay period compare favorably with a pre-defined maximum intensity and/or a pre-defined maximum delay period, respectively, the value document or other article may be considered to be authentic. Otherwise, when either or both the maximum intensity and/or the delay period do not compare favorably with a pre-defined maximum intensity and/or a pre-defined maximum delay period, respectively, the value document or other article may be considered to be not authentic. As used herein, the term “compare favorably” means equals or approximately equals (e.g., equal within some degree of accuracy, such as 10 percent or some other value).

From the foregoing, it will be appreciated that, although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of authenticating a value document or other article using an authentication apparatus, the method comprising the steps of:

a) providing the value document or other article to the authentication apparatus, the value document or other article comprising at least one taggant having a crystal lattice doped with a first rare earth active ion;

b) applying radiation having a first wavelength to the value document or other article from an illumination source of the authentication apparatus for an illumination duration;

wherein the taggant absorbs the radiation and emits infrared radiation having a second wavelength that is greater than the first wavelength of the radiation, the emitted infrared radiation having a maximum intensity that occurs at a delay period measured from the end of the illumination duration, the delay period being greater than about 0.1 millisecond;

c) detecting intensity of the emitted infrared radiation as a function of time with a sensor of the authentication apparatus to produce emission data; and d) processing the emission data with a processor of the authentication apparatus to determine whether the value document or other article is authentic, wherein the processing includes identifying the maximum intensity of the emitted infrared radiation that occurs after the delay period.

2. The method of claim 1, wherein the illumination duration is from about 0.1 milliseconds to about 1 millisecond.

3. The method of claim 1, wherein the first rare earth active ion absorbs the radiation from the illumination source into a first storage energy level and transfers non-radiatively the absorbed radiation at a transfer rate $\tau 1$ to a second storage energy level having a lifetime $\tau 2$, the transfer rate $\tau 1$ being from about 50% of $\tau 2$ to about 95% of $\tau 2$, and the second storage energy level decays radiatively to a lower energy level by emitting the infrared radiation having a second wavelength.

4. The method of claim 3, wherein the illumination duration is from about 4% of $\tau 2$ to about 10% of $\tau 2$.

5. The method of claim 3, wherein τ2 is from about 1.5 milliseconds to about 10 milliseconds.

6. The method of claim 3, wherein τ1 is from about 1 millisecond to about 9 milliseconds.

7. The method of claim 1, wherein the value document or other article is stationary during the steps of applying the illumination to the value document or other article and detecting intensity of the emitted infrared radiation.

8. A value document or other article that includes an authentication feature, the value document or other article comprising:

a taggant comprising a crystal lattice doped with a first rare earth active ion, the taggant being configured to absorb radiation having a first wavelength from an illumination source during an illumination duration having an end, and to emit infrared radiation having a second wavelength that is greater than the first wavelength of the radiation from the illumination source;

wherein the infrared radiation emitted from the taggant has a maximum intensity that occurs at a delay period measured from the end of the illumination duration, the delay period being greater than about 0.1 milliseconds.

9. The value document or other article of claim 8, wherein the first rare earth active ion absorbs the radiation from the illumination source into a first storage energy level and transfers non-radiatively the absorbed radiation at a transfer rate τ1 to a second storage energy level having a lifetime τ2, the transfer rate τ1 being from about 50% of τ2 to about 95% of τ2, and the second storage energy level decays radiatively to a lower energy level by emitting the infrared radiation having a second wavelength.

10. The value document or other article of claim 9, wherein the crystal lattice of the taggant is further doped with a second rare earth active ion, and the second storage energy level is a storage energy level of the second rare earth active ion.

11. The value document or other article of claim 8, wherein the crystal lattice comprises a composition selected from the group consisting of sodium yttrium fluoride and sodium ytterbium fluoride.

12. The value document or other article of claim 8, wherein the value document or other article comprises a substrate and a printed material on the substrate.

13. The value document or other article of claim 12, wherein the substrate of the value document or other article comprises the taggant.

14. The value document or other article of claim 13, wherein the taggant is present in an amount from about 0.1% by weight of the substrate to about 30% by weight of the substrate.

15. The value document or other article of claim 12, wherein the printed material of the value document or other article comprises the taggant.

16. The value document or other article of claim 8, wherein the crystal lattice of the taggant is further doped with a second rare earth active ion.

17. The value document or other article of claim 16, wherein the first rare earth active ion absorbs radiation from the pulsed illumination into a first storage energy level and transfers non-radiatively the absorbed radiation to a second storage energy level of the second rare earth active ion.

18. The value document or other article of claim 16, wherein the first rare earth active ion is erbium and second rare earth active ion is ytterbium.

19. The value document of claim 18, where the erbium is substituted for rare earth ions of the host lattice at a substitution percentage in a range from about 6 to about 20 percent, and the ytterbium is substituted for rare earth ions of the host lattice at a substitution percentage in a range from about 6 to about 20 percent.

20. An authentication apparatus comprising:

an illumination source that applies radiation having a first wavelength to a value document or other article for an illumination duration having an end;

a sensor that detects intensity of infrared radiation emitted from the value document or other article over time to produce emission data, the infrared radiation emitted from the value document or other article having a second wavelength greater than the first wavelength and having a maximum intensity that occurs at a delay period measured from the end of the illumination duration, the delay period being greater than about 0.1 milliseconds; and a processor that processes the emission data and identifies the maximum intensity of the emitted infrared radiation that occurs after the delay period in order to determine whether the value document or other article is authentic.

* * * * *